Patented Oct. 3, 1950

2,524,739

UNITED STATES PATENT OFFICE 2,524,739

PROCESS FOR THE PRODUCTION OF CERAMIC ARTICLES

Robert Le Grande Stone, Ligonier, Pa., assignor to the United States of America, as represented by the administrator, Civilian Production Administration No Drawing. Application May 31, 1946, Serial No. 673,484

3 Claims. (Cl. 25—157)

The invention described herein may be manufactured and used by or for the Government of the United States for governmental purposes without the payment to me of any royalty thereon.

This invention relates to a method of making ceramic articles comprising or containing steatite minerals.

It is an object of this invention to produce ceramic compositions of great unfired strength. Another object is to produce steatite ceramic compositions which can be cut, drilled, tapped or otherwise shaped at very high speeds. A further object is to produce unfired steatite compositions which can be cut or otherwise fashioned into exceedingly thin shapes with a high degree of accuracy. Other objects will be apparent as the ensuing description proceeds.

The foregoing and other objects are accomplished in accordance with this invention wherein unfired steatite ceramic articles are prepared by combining a steatite mineral with a gum and an alkylol amine. It has been found that cured but unfired ceramic articles having a strength of the order of grade A Portland cement concrete can readily be prepared by combining a major proportion of a steatite mineral with minor proportions of suitable vegetable gums and triethanol amine or other suitable alkylol amines and thereafter curing the suitably shaped article at a temperature not higher than 450 degrees F. During the curing process, which is preferably carried out in an atmosphere saturated with the selected alkylol amine, the article develops a compressive strength of between 2000 pounds per square inch up to as high as 9000 pounds per square inch, depending upon the particular steatite minerals employed, the particular gum employed, and the selected alkylol amine. Since grade A Portland cement concrete develops a strength of only about 3000 pounds per square inch, one can readily visualize the strength developed by my ceramic compositions.

Suitable steatite minerals for employment in accordance with this invention include talc, chlorite, pyrophyllite, sheridanite and similar hydrous magnesium silicates generically known as steatites. Talc itself constitutes a preferred steatite mineral for employment in accordance with this invention and generally is employed in major proportions in the final ceramic composition. Usually, it is preferred that at least 50 percent by weight of talc or other steatite mineral be employed.

Suitable alkylol amines for employment in this invention include the mono-di and triethanol, propanol and butanol amines as well as similar alkylol amines having from 2 to 6 carbon atoms in each alkyl residue. A preferred alkylol amine for employment in this invention is triethanol amine, since it is readily available, requires only a moderate curing temperature, and yields a cured unfired ceramic article when suitably combined, which often has a strength of from 2 to 3 times that of first grade concrete or even higher strengths. Generally, the selected amine is incorporated in an amount of not more than 14 percent by weight in the ceramic composition, based on the total weight of the composition. Preferably, between 10 and 14 percent by weight of triethanol amine or other selected alkylol amine has been found to yield consistently high quality cured articles in accordance with this invention.

Suitable gums for incorporation with the steatite mineral and the alkylol amine in accordance with this invention include starch conversion products, gum arabic, jungle gum, rosin, locust bean gum, gum ghatti and similar natural and synthetic gums or resinous substances. Generally, it is preferred to employ a naturally occurring vegetable gum of which gum ghatti is preferred. Usually, the selected gum is incorporated in an amount not higher than 10 percent by weight based on the total composition, and preferably the gum ghatti or other gum is employed in an amount between 2 and 5 percent by weight.

In preparing the ceramic compositions of this invention it is generally desirable to comminute the talc or other selected steatite body to a uniformly fine size of, for example, minus 50 mesh to minus 200 mesh or finer as determined by a standard Tyler screen, and thereafter to incorporate a small amount of water, say between 4 and 18 percent by weight in order to provide a desirable plastic consistency. At this time also additional minerals suitably comminuted may be incorporated in the steatite base body when it is desired to modify the properties of the final fired ceramic article. For example, substances such as ball clay, flint, alumina, feldspars, and similar ceramic adjuncts can be incorporated and if desired can replace the whole or a major part of the steatite mineral to yield other ceramic compositions having similarly high unfired strengths.

After thoroughly wetting and mixing of the ceramic base body as above described, the selected amount of triethanol amine or other alkylol amine is incorporated in the mixture and thoroughly milled in accordance with usual ceramic practice. Thereafter, the desired gum, such as corn gum, tapioca gum, gum ghatti, or the like, is incorporated in the ceramic mix. The whole is thoroughly mixed together and the desired article shaped by extrusion under high pressure, molding, turning on a potter's wheel or other similar method.

After forming the desired shaped article, it is then baked or cured at an elevated temperature not higher than 450 degrees F. to remove the water and promote the reaction between the gum and the alkylol amine with the ceramic base body. Generally, a baking or curing temperature between 300 and 400 degrees F. will be found satisfactory and preferably the shaped article is cured at a temperature of about 350 degrees F. It is preferable to complete the curing or baking operation in an oven wherein the atmosphere can be saturated with triethanol amine or other suitable alkylol amine since it has been found that the surfaces of the article are fully cured by following this procedure.

After the curing operation has been completed, the shaped article will be found to have an extremely high strength and toughness similar to or higher than first grade Portland cement concrete. For example, compressive strengths between 2000 and 9000 pounds per square inch can easily be attained by this invention.

The cured articles can be shaped to very precise dimensions or into intricate shapes such as employed in high frequency radio communication work by turning on a lathe, or other shaping devices. After curing and if desired shaping to close tolerances, the ceramic articles prepared in accordance with this invention can then be fired in the usual manner at elevated temperatures of say 2000 to 2400 degrees F. in order to develop the full ceramic properties of the composition.

The following table shows in parts by weight exemplary compositions prepared in accordance with this invention and cured at a temperature of about 350 degrees F.:

From the foregoing, it will be apparent that this invention has provided ceramic compositions of very great unfired strength. Unfired strengths in excess of 9000 pounds per square inch have been attained in accordance with this invention, which is approximately three times the compressive strength of first quality Portland cement concrete. Obviously, in the fashioning of complicated steatite bodies or other ceramic compositions, such an unfired strength permitting machining, drilling, tapping, and similar shaping operations to close dimensions, are highly advantageous. Perfect sections of washers and thin disks have been cut from cured steatite bodies prepared in accordance with this invention having uniform thicknesses of not over six mils.

While it is not intended to be bound by any theory of reaction, it is assumed that the terrific strengths developed by the bodies prepared in accordance with this invention may result from the production of some sort of an inorganic-organic complex not hitherto identified.

Various changes can be made in the detailed embodiments of this invention without departing from the broad spirit and scope thereof.

What is claimed is:

1. A process for the production of a ceramic article having an unfired strength of the order of grade A Portland cement concrete, which comprises incorporating a comminuted steatite mineral with minor proportions of water, a vegetable gum and triethanolamine, then shaping the desired article, and baking at a temperature between 300 and 400 degrees Fahrenheit in an atmosphere of triethanolamine.

2. The process of claim 1, employing gum ghatti as the vegetable gum.

3. The process of claim 1, employing between 10 and 14 percent triethanolamine, between 4 and 7 percent water and baking at a temperature of about 350 degrees Fahrenheit.

ROBERT LE GRANDE STONE.

REFERENCES CITED

The following references are of record in the file of this patent:

UNITED STATES PATENTS

| Number | Name | Date |
|---|---|---|
| 1,977,698 | Scott | Oct. 23, 1934 |
| 2,390,765 | York et al. | Dec. 11, 1945 |

Table I

| | 1 | 2 | 3 | 4 | 5 | 6 | 7 | 8 |
|---|---|---|---|---|---|---|---|---|
| Comminuted talc | 100 | | 50.0 | 50.0 | | | 85.0 | 100 | 85.0 |
| Clay | | 100 | 25.0 | | | | 15.0 | | 15.0 |
| Fluxes (e. g. Feldspar) | | | 15.0 | | | | | | |
| Flint, alumina, etc. | | | 10.0 | | | | | | |
| Comminuted serpentine | | | | 50.0 | 100.0 | | | |
| Gum (e. g. Jungle gum, gum Ghatti) | 2.0 to 5.0 | 2.0 to 5.0 | 2.0 to 5.0 | 2.0 to 5.0 | 2.0 to 5.0 | 3.0 | | |
| Gum (e. g. Corn gum, tapioca gum) | | | | | | | 2.0 to 5.0 | 3.0 |
| Amine (e. g. Triethanolamine) | 4.0 to 14.0 | 4.0 to 14.0 | 4.0 to 14.0 | 4.0 to 14.0 | 4.0 to 14.0 | | 4.0 to 14.0 | |
| Water | 14.0 to 4.0 | 14.0 to 4.0 | 14.0 to 4.0 | 14.0 to 4.0 | 14.0 to 4.0 | 18.0 | 14.0 to 4.0 | 18.0 |
| Compressive strength, p. s. i. | 5,000+ | 4,500+ | 5,000+ | 7,000+ | 9,000+ | 2,800 | 4,100+ | 2,200 |